(12) United States Patent
Nowoczynski et al.

(10) Patent No.: US 9,152,649 B2
(45) Date of Patent: Oct. 6, 2015

(54) MAINTAINING ORDER AND FAULT-TOLERANCE IN A DISTRIBUTED HASH TABLE SYSTEM

(71) Applicant: DataDirect Networks, Inc., Chatsworth, CA (US)

(72) Inventors: Paul J. Nowoczynski, Brooklyn, NY (US); Jason M. Cope, Columbia, MD (US); Pavan Kumar Uppu, Laurel, MD (US); Donald J. Molaro, Cupertino, CA (US); Michael J. Piszczek, Laurel, MD (US); John G. Manning, Ellicott City, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 197 days.

(21) Appl. No.: 14/050,156

(22) Filed: Oct. 9, 2013

(65) Prior Publication Data
US 2014/0108473 A1    Apr. 17, 2014

Related U.S. Application Data

(60) Provisional application No. 61/715,241, filed on Oct. 17, 2012.

(51) Int. Cl.
*G06F 17/30* (2006.01)

(52) U.S. Cl.
CPC .... *G06F 17/30227* (2013.01); *G06F 17/30094* (2013.01)

(58) Field of Classification Search
CPC ............... G06F 17/30209; G06F 17/30227; G06F 17/30377; G06F 17/3038; H04L 67/1095; H04L 67/1097
See application file for complete search history.

(56) References Cited

PUBLICATIONS

Moser, M., & Haridi, S. (2007). Atomic commitment in transactional DHTs. In Towards Next Generation Grids (pp. 151-161). Springer US.*

* cited by examiner

*Primary Examiner* — William Spieler
(74) *Attorney, Agent, or Firm* — SoCal IP Law Group LLP; Mark A. Goldstein (57) ABSTRACT

Data storage systems and methods for storing data are described herein. The storage system includes a first storage node is configured to issue a first delivery request to a first set of other storage nodes in the storage system, the first delivery request including a first at least one data operation for each of the first set of other storage nodes and issuing at least one other delivery request, while the first delivery request remains outstanding, the at least one other delivery request including a first commit request for each of the first set of other storage nodes. The first node causes the first at least one data operation to be made active within the storage system in response to receipt of a commit indicator along with a delivery acknowledgement regarding one of the at least one other delivery request.

14 Claims, 9 Drawing Sheets

MAINTAINING ORDER AND FAULT-TOLERANCE IN A DISTRIBUTED HASH TABLE SYSTEM

RELATED APPLICATION INFORMATION

This patent claims priority from provisional patent application No. 61/715,241 filed Oct. 17, 2012 which is incorporated by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to data stored in a data storage system and an improved architecture and method for storing data to and retrieving data from a data storage system made up of a large number of nodes and including a distributed hash table.

2. Description of the Related Art

A file system is used to store and organize computer data stored as electronic files. File systems allow files to be found, read, deleted, and otherwise accessed. File systems store files on one or more storage devices. File systems store files on storage media such as hard disk drives and solid-state storage devices.

Various applications may store large numbers of documents, images, audio, videos and other data as objects using a distributed data storage system in which data is stored in multiple locations.

Distributed hash tables (DHT or, plural, DHTs) are decentralized data storage systems that enable information, such as computer data, to be stored within a group of servers. When file access is requested, a hashing function is used to point the request to a particular location (or locations) within the group of servers. In order to ensure that individual data sets remain available within the group of servers, prior art systems have enforced a blocking system in which data elements may not be written to when others are in the process of accessing those data elements. A hash system is updated with the location of data sets as the data is placed in the DHT storage system.

Maintaining fault tolerance and ensuring that data is properly allocated amongst a group of storage nodes operating as a DHT or part of a DHT is an important aspect of any DHT system. Specifically, the storage nodes must operate in such a way that data consistency is maintained while enabling high data throughput. Reducing the time necessary to ensure data consistency across the DHT is important in such high speed DHT systems and has not been addressed in the prior art.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

An elegant solution for maintaining a large data set in a distributed way is to distribute the data according to a distributed hash table. Under such a scheme, a hashing algorithm or similar "hash" is applied to any read, write, or other access request for data stored in the DHT system. This hash will point a request to the right portion of the distributed data and enable read, write and other requests to take place in an orderly fashion. Such a distributed hash table system is described in earlier filed co-pending patent application Ser. No. 14/028,292, now U.S. Pat. No. 9,128,826 issued Sep. 8, 2015.

The DHT system described herein groups operations into batches called jumbo transaction groups (JTGs) which results in fewer, larger transactions among the peer storage nodes. The DHT system also requires that the JTGs must be completed in the order they were requested, to ensure data consistency. The DHT system requires that each data operation must be made active at substantially the same time for a group of storage nodes involved in the JTG so that a consistent data set is presented to later requests. Finally, the DHT system enables subsequent JTGs delivery requests to be appended with commit requests for earlier JTGs. This system ensures data consistency across the DHT, while lowering the network overhead required to accomplish this consistency all while ensuring that a uniform data set is presented by each node in the DHT.

Environment

Figure 1:
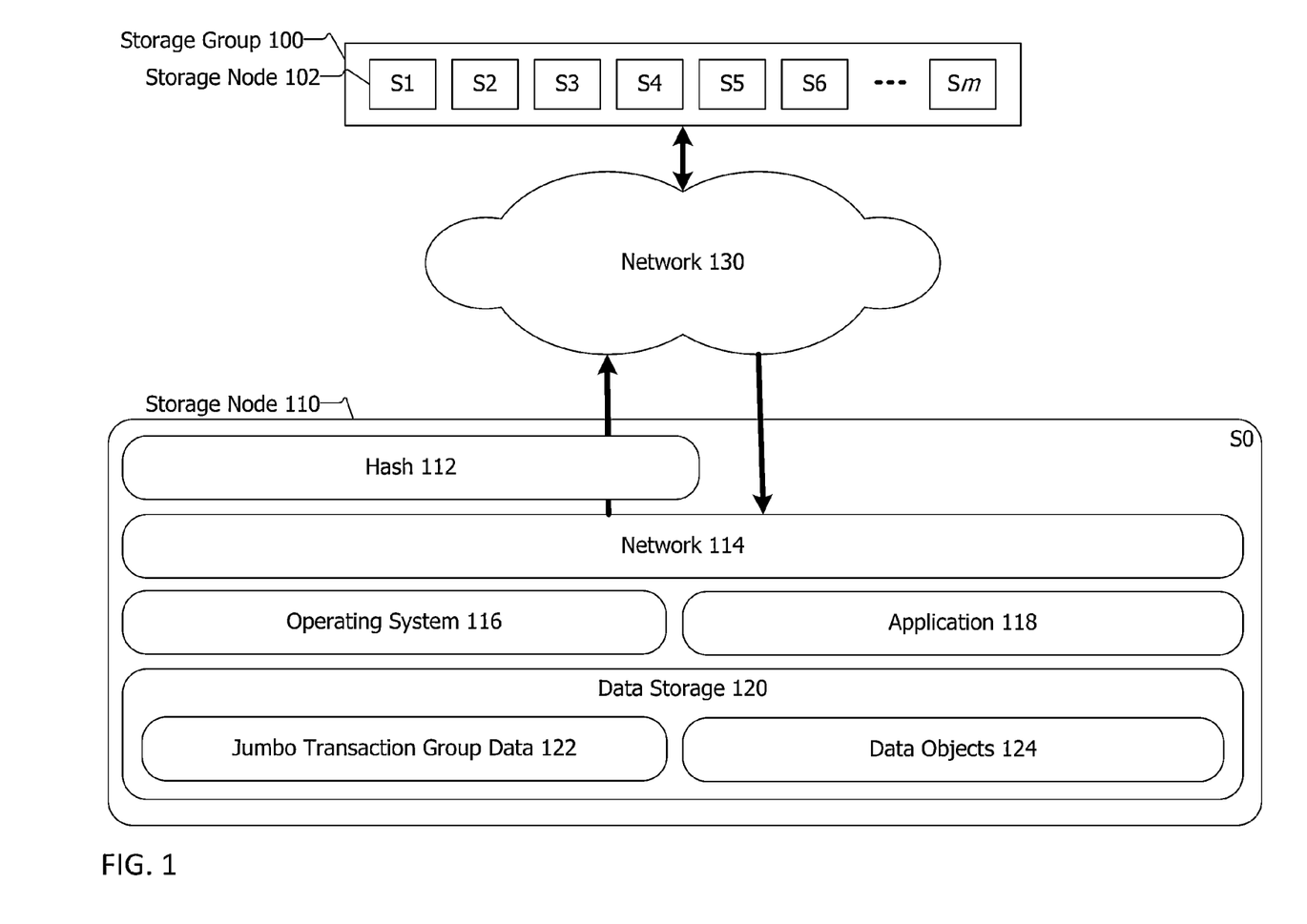
FIG. 1 is a block diagram of a group of storage nodes in a network.

FIG. 1 is a block diagram of a series of storage nodes in a network. The nodes S0 110, S1 102 through Sm, of which only S0 110 and S1 102 are labeled, may make up a storage group 100. These storage nodes S0 110, S1 102 and all those making up storage group 100 may be server computers with central processing units, memory, non-volatile storage, network connectivity and various input and output systems. Each of the storage nodes has a plurality of HDD, SSD, etc. coupled thereto or included therein. The storage nodes are capable of operating, as a group, as a DHT system or a part of a DHT system. In most cases, the storage nodes operate solely as storage nodes and communicate almost exclusively with one another to orchestrate the storage of data objects, the updating of tables and metadata related to the storage of data objects and to communicate requests to store data objects.

The storage group 100 may be interconnected by a network, such as network 130. The network 130 may be wired or wireless or combination thereof. Data is written to the network from other nodes, such as storage node S0 110 through a hash 112. This hash 112 may be or include an algorithm, a key, a seed, or any other form of data that may be used to derive the location of a particular data object within the DHT system. All or a portion of the "hash" may be stored on each storage node, as necessary.

A "data object," as used herein means data stored within the DHT system in the form of files, file fragments, raw binary data and data in various other forms. A data object may be or include multiple bits, multiple bytes, multiple words, a block, a stripe, a file, a file segment, or other grouping of information including entire computer readable files or portions of a computer readable file which may include or represent text, numbers, data, images, photographs, graphics, audio, video, computer programs, computer source code, computer object code, executable computer code, and/or a combination of these and similar information. A data object may be or include instructions, data, or at least a part of a hash or key pertaining to or describing other data stored in a DHT system. A "request" as used herein means an attempted access of a data object. A request may be, for example, an attempt to write or an attempt to read a data object.

Other nodes may interact with storage node 110 through a network adaptor 114. An operating system 116 and application layer 118 (including applications embodying the systems described herein) may also be present on each node. Data storage 120 may store jumbo transaction groups 122 (discussed below) along with data objects 124.

Figure 2:
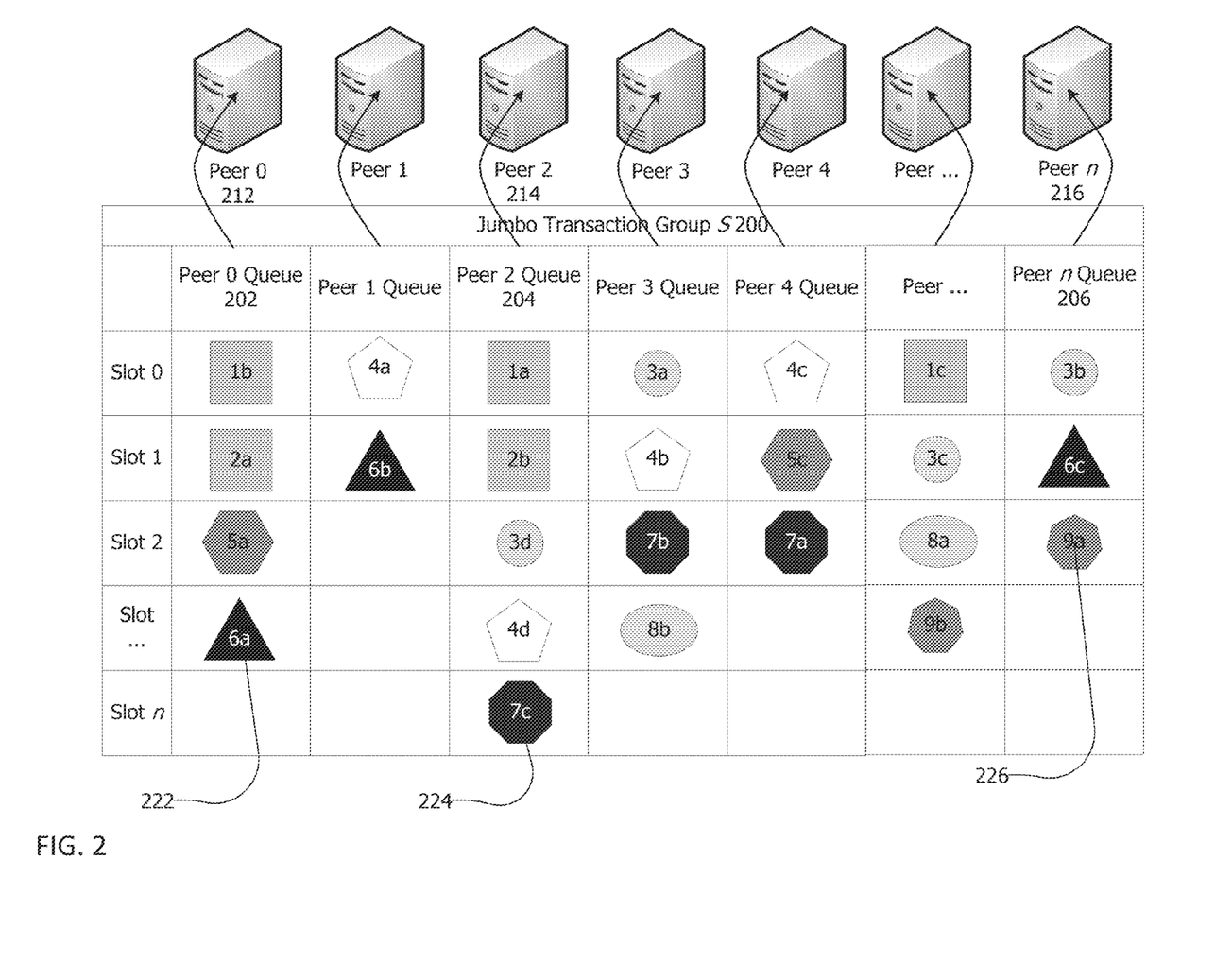
FIG. 2 is a jumbo transaction group S on server Y.

FIG. 2 is a jumbo transaction group (JTG) S 200 which may operate on a server, such as storage node s0 110 shown in FIG. 1. A "jumbo transaction group," such as jumbo transaction group S 200, is a plurality of batched operations from one storage node of a storage group that are designated for one or more other storage nodes. For example, a JTG may be a batch of operations involving a first storage node and a plurality of other storage nodes in communication with the first storage node and making up a part of a DHT. The word "peer" within this patent refers to storage nodes within a particular storage node's storage group within an overall a storage system. In FIG. 2, a JTG batching process is presented in table form for illustrative purposes, but other data structures and storage methods for the data may be used.

JTGs may be used, for example, to batch a series of data object requests together so that a given storage node may make requests of its peer storage nodes in groups, rather than as each request comes into the storage node. In this way, the volume of data traffic across all of the storage nodes can be minimized, while ensuring that the traffic that does occur is substantive. This helps to avoid situations in which the network is flooded with millions of requests to access, read or write relatively small amounts of data (bytes or kilobytes). Instead, requests and associated communications are batched to lower the overall network overhead of these communications.

The JTG group S 200 includes columns dedicated to each of a plurality of storage nodes (peers) involved in the JTG. Examples of these peers include peer 0 212, peer 2 214 and peer n 216. The arrows pointing from the JTG S 200 to these peers 212, 214, and 216 indicate that the data from the peer 0 queue 202, the peer 2 queue 204 and the peer n queue 206 are to be written to these peers, respectively.

The total number of storage nodes involved in a given JTG may vary from one to many. A typical scenario involves more than five, but is dependent upon the total number of members in a given storage group, the data to be written, available buffer memory for storing uncommitted JTGs in the storage peers, network bandwidth and other, similar considerations. The rows of the JTG group S 200 are "slots" of data objects for which a request to another peer has been generated. So, for example, peer 0 queue 202 includes four data objects for which requests have been generated, including a request involving data object 6a 222. Peer 2 queue 204 includes at least n pending data object requests including a request involving data object 7c 224. Finally, peer n queue 206 includes data object 9a 226.

The JTG peer queues may be limited such that the filling of a queue prompts the JTG 200 to begin executing a jumbo transaction. For example, peer 2 queue 204 appears to be completely full with the addition of the data object 7c 224. That may prompt the entire JTG to write all of the pending data objects to each of that object's respective peers.

In FIG. 2, reiterative copies of the same data are identified by their shapes. Similar shading is used to aid in identifying similar shapes.

In addition, multiple copies of the same data may be "ranked" according to the peer primarily responsible for a data object and other peers various responsibilities. Data object 1, for example, is being written in both peer 0 queue 202, slot 0 and in peer 2 queue, slot 0. Once the associated jumbo transaction is completed, data object 1 will be in both places with peer 2 214 having primary responsibility.

Figure 3:
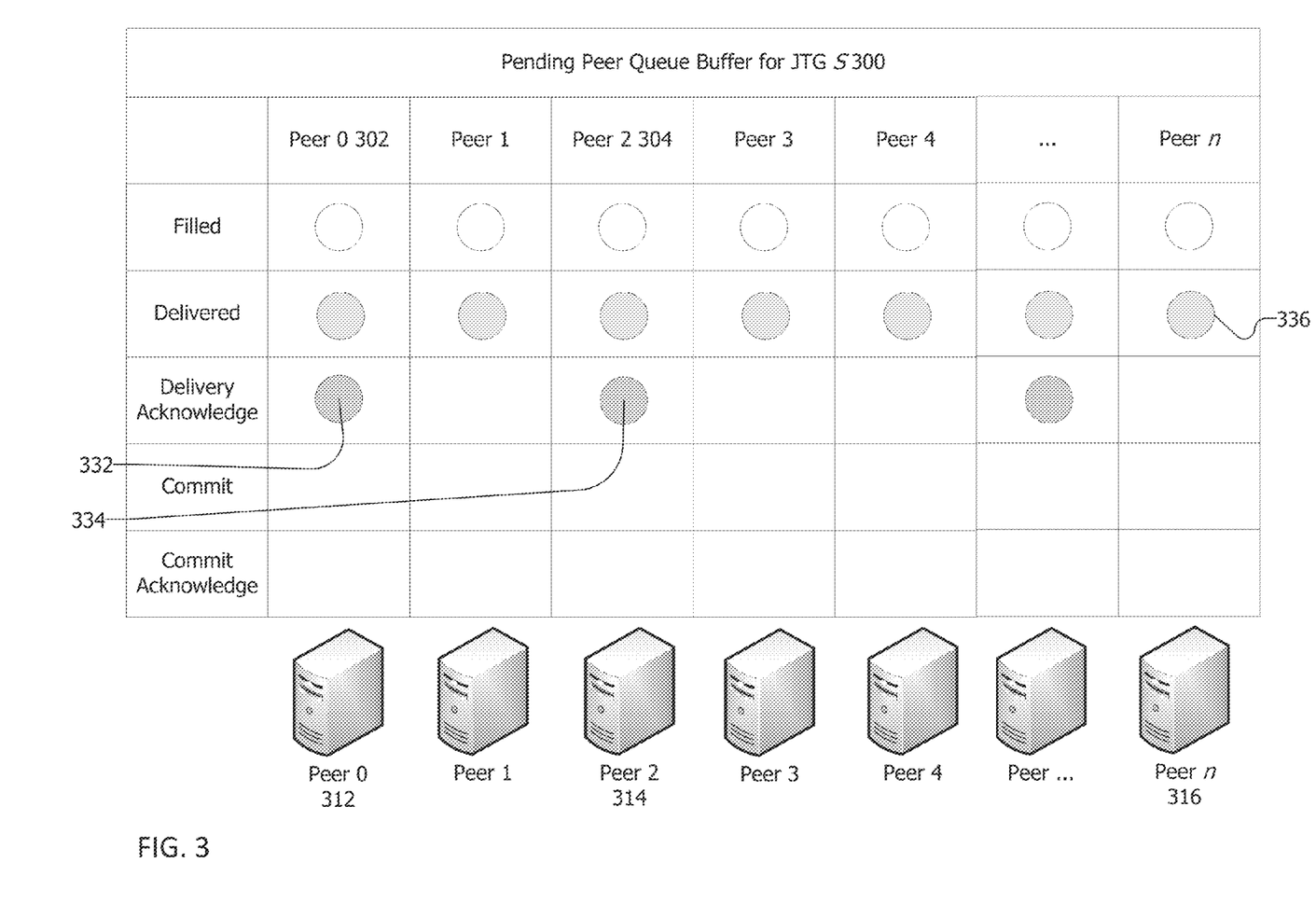
FIG. 3 is a peer queue buffers for jumbo transaction group S.

Turning now to FIG. 3, pending peer queue buffers for jumbo transaction group S 300 are shown. Peer 0 312, peer 2 314 and peer n 316 may be peers 0 212, 2 214, and n 216 from FIG. 2.

JTG peer queue buffers typically utilize a two-stage commit process. The first stage begins when a request reaches a "filled" state meaning that it is ready to be delivered by the storage node making the request. A request is then "delivered" to a storage node or nodes and a "delivery acknowledgement" is provided by those nodes. "Delivered" means that the delivery of the peer queue buffer to the appropriate storage node has begun. "Delivery acknowledgement" means that the peer queue buffer has been acknowledged, in a manner similar to a TCP/IP "ACK", by the intended recipient storage node or nodes.

The final stage is made up of a "commit" and a "commit acknowledge." The "commit" is a command to fulfill the request by making the data objects in the peer queue buffer active in the DHT). The "commit acknowledge" is a response that the data objects in the peer queue buffer have been made active.

This process ensures that these batched transactions are completed by each storage node that is relevant to the request. By requiring commits and commit acknowledgements during the stages, data consistency is ensured. Requests coming into the DHT to access data referenced by the data objects committed using this process receive the same responses as to the status of the associated data object no matter which of the storage nodes are queried.

Here, delivery requests have been made to each of the peer nodes and associated delivery acknowledgements 332 and 334 have been received by peer 0 312 and peer 2 314, respectively. Peer n 316 is still at the delivered 336 stage. This means that, for the particular jumbo transaction for group S, peer 9 312 and peer 2 314 are ready for a commit request, while peer n 316 has yet to respond to the delivery request made by the server initiating the jumbo transaction. Once each of the peers has acknowledged delivery, the commit phase of the process can commence. That is, the commit phase begins only when all of the peers have acknowledged delivery.

Figure 4:
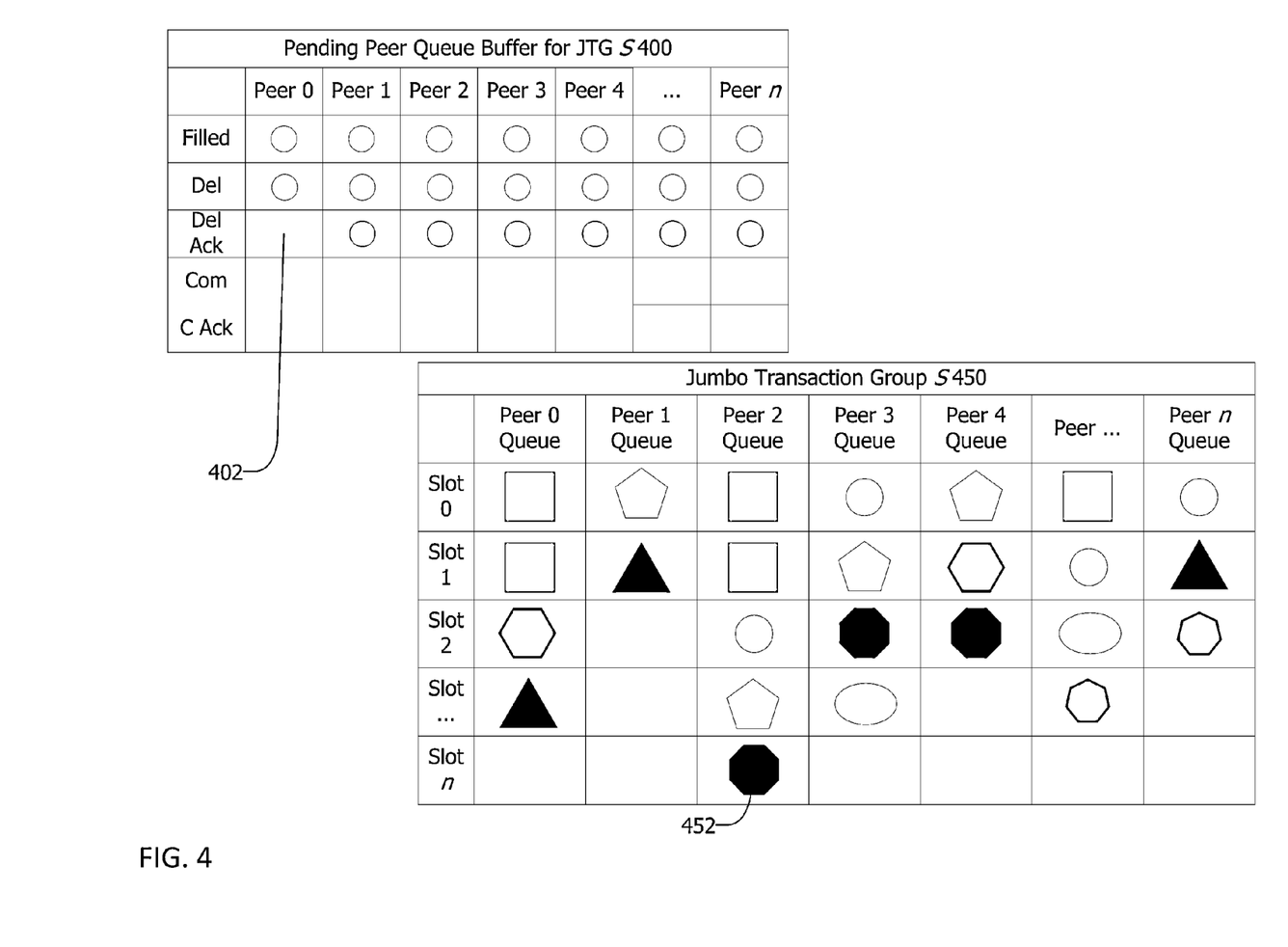
FIG. 4 is a pending jumbo transaction for group S and associated peer queue buffers preparing to enter the commit phase.

FIG. 4 is a pending jumbo transaction for group S 450 and associated peer queue buffers for JTG S 400 preparing to enter the commit phase. In the pending jumbo transaction for group S 400, all of the peers have provided a delivery acknowledgement except for peer 0. This is represented by the empty space 402 in the delivery notification row and column associated with peer 0. Once a delivery acknowledgement is received from each of the peers, the initiating peer can issue a commit request to cause the delivered data object to be made active within the storage group. That is, the initiating peer issues a commit request only when a delivery acknowledgement has been received from all of the peers. To be "made active" in the context of this patent means that the data object will be available to requestors accessing the data object whose information is stored in the DHT.

The data objects to be made active are represented in JTG S 450, which is the same as the JTG S 200 shown in FIG. 2. The delivery request and associated delivery acknowledgments shown in the pending peer queue buffer for group S 400 above indicate that the data objects represented by the JTG S 450 has been delivered to each of the associated peers in the JTG S and that each of those peers has acknowledged delivery (except peer 0) and is now ready to enter the commit phase. The data object 452 filling all available slots in the peer 2 queue may be the trigger that causes the jumbo transaction to begin being processed.

Figure 5:
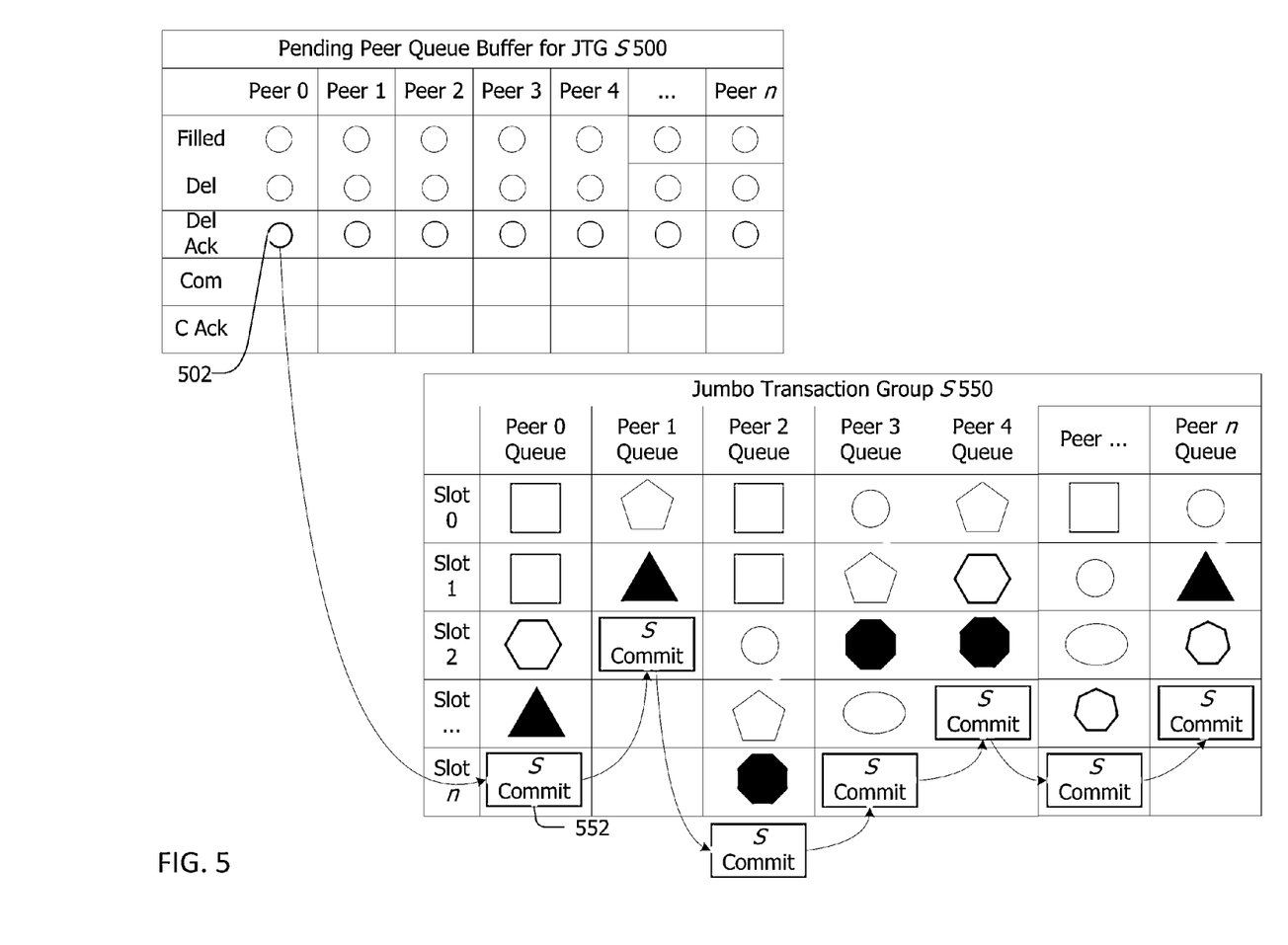
FIG. 5 is a pending jumbo transaction for group S and associated peer queue buffers that have begun the commit phase.

FIG. 5 is a pending jumbo transaction group S 550 and associated peer queue buffers for JTG S 500 that have begun the commit phase. This is the next step after that shown in FIG. 4. The peer queue buffers for JTG S 500 and the JTG S 550 depict the next step after receipt of the final delivery acknowledgement 502 in the pending jumbo transaction for group S 500. Upon receipt of the delivery acknowledgement 502, the initiating peer issues a JTG S commit request 552 that is sent to each of the peers regarding the data in each peer's queue (for which delivery was previously completed and acknowledged). Although the commit request 552 is shown in the JTG S 550 as iterating through each of the peers for purpose of illustration, the commit request is preferably simultaneously broadcast to each of the peers.

The commit request 550 causes all of the data objects in the respective peers' queues to be made active within the peer. A commit acknowledgement may be transmitted as an addendum to a later JTG, such as JTG S+n delivery request and associated JTG S+n delivery acknowledgment. The commit request is a relatively small amount of data once all of the data objects have been delivered. The later delivery request may include a great deal more data than a commit request. Appending the comparatively small amount of data necessary for a commit request requires very little additional data. Appending the comparatively small amount of data necessary for a commit acknowledgement to the subsequent delivery acknowledgement also requires limited additional data. Completing the commit requests and associated commit acknowledgements in this way requires less network overhead, results in faster operation of the DHT and causes a quicker data object activation process.

In addition, commit status for any peers with which the storage node delivering a commit acknowledgement may also be shared with the peer to whom the delivery acknowledgement is being transmitted. In this way, the peer receiving the delivery acknowledgement may receive an update of the status of one or more committed data operations that have been made active in the group of which that peer may not yet be aware. In particular, the commit acknowledgement may not be the only commit acknowledgement in a given delivery acknowledgement. Instead, an entire table or other data structure identifying commit acknowledged requests may be shared of which a particular commit acknowledgement is only a part.

Figure 6:
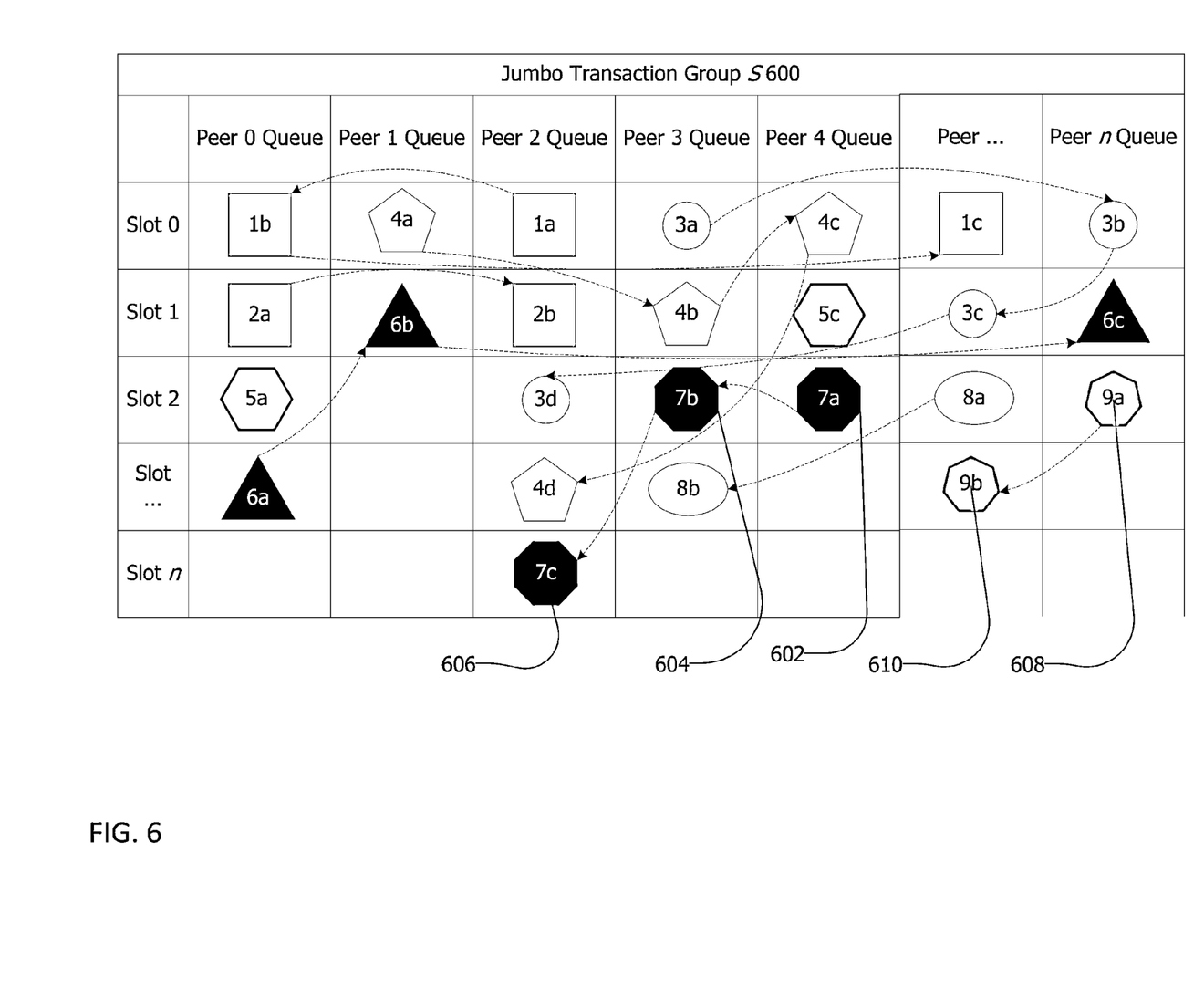
FIG. 6 is an update queue dependency matrix.

FIG. 6 is an update queue dependency matrix for JTG S 600. The dependency matrix 600 corresponds to the data objects shown in FIG. 2, but is primarily illustrative of the ways in which data is related. In a DHT system, data is written simultaneously to multiple peers or storage nodes to ensure redundancy and data consistency. As a result of this, interactions between the peers are common, and the data sharing described above by appending commits and commit acknowledgements to later requests results in rapid updating of the overall DHT as to the status of a given JTG—even without explicit, separate commit requests and commit acknowledgements. This ensures that data accesses to the DHT are consistent no matter to which storage node a given request is directed. This also ensures that data is replicated and that in the event of a failure of one or more peers, the other peers are able to recover from that failure. A description of a failure discovery and recovery system and method is disclosed in patent application Ser. No. 14/035,913 filed Sep. 24, 2013.

Processes

Figure 7:
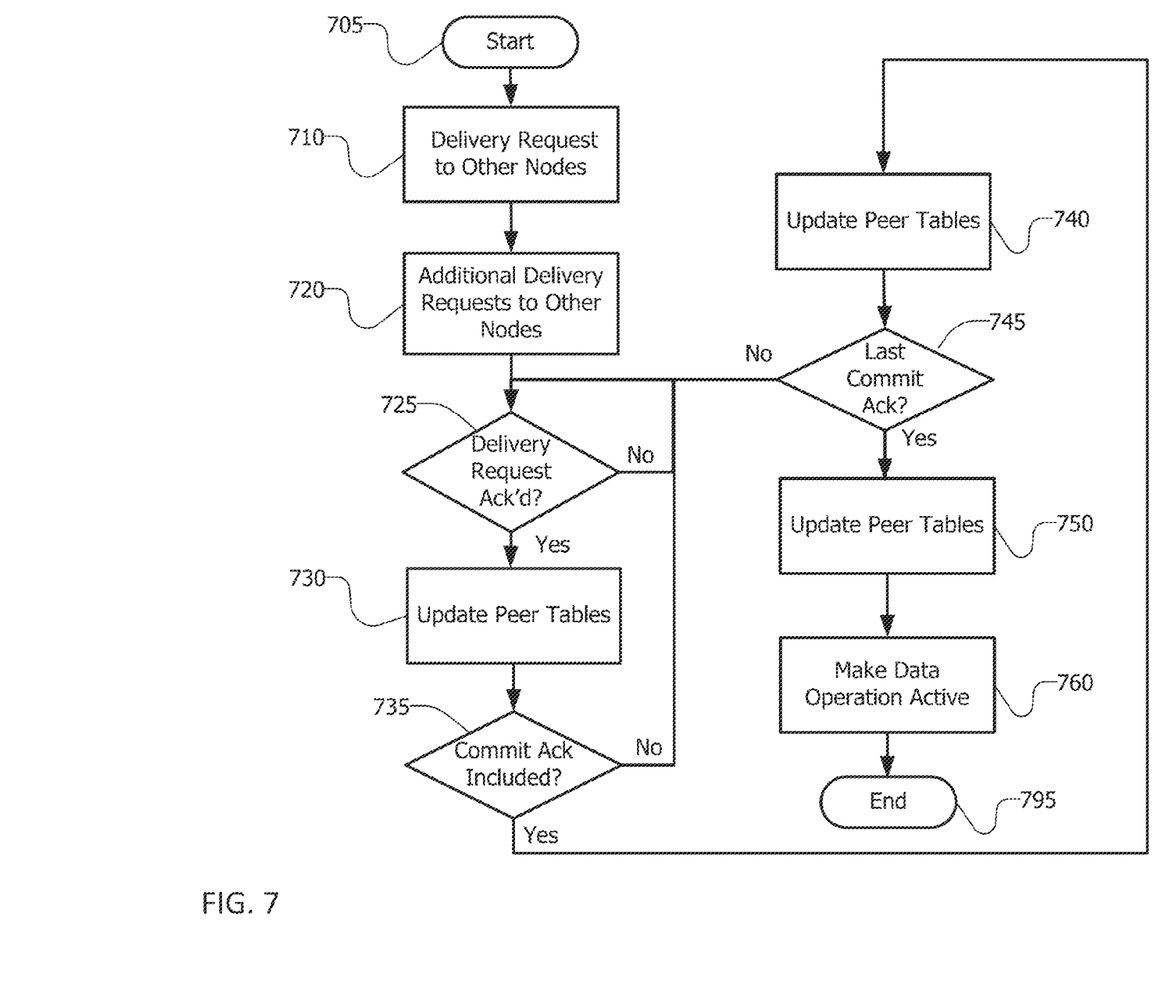
FIG. 7 is a flow chart of a method of a high speed, consistency maintaining multi-node commit process.

Turning now to FIG. 7, a flow chart of a method of a high-speed, consistency maintaining multi-node commit process is shown. The process has a start 705 and an end 795 but may be cyclical. In addition, more than one instance of the process on one or more storage nodes may simultaneously be at various stages. Indeed, the process envisions using later requests incorporating responses to earlier requests.

Once the process has started at 705, the first storage node makes a delivery request to other storage nodes at 710. This delivery request may be a part of a JTG, such as JTG S 200 of FIG. 2, in which a plurality of requests are being made to multiple storage nodes at once. Many requests may be made to any number of storage nodes from the first storage node. As discussed above, a delivery request to each storage node includes the data object to be made active and any metadata or instructions pertaining to the data object. The first storage node awaits an acknowledgement of the delivery request from each of the peer storage nodes. Acknowledgement of this delivery request may or may not occur before the additional delivery request discussed below occurs.

The first storage node may then make any number of additional delivery requests for other, later JTGs at 720. This may be a single JTG S+1 or may be any number of JTGs up to a JTG Max for the first storage node. Once a JTG Max has been reached, the first storage node stops issuing additional JTGs until it receives a commit acknowledgement from each peer storage node in a given JTG. At that point, a single JTG is "released", enabling the first storage node to issue one more JTGs. JTG Max may be determined, for example, based upon buffer memory available in a JTG or in a group of JTGs.

One or more of these additional delivery requests may incorporate a commit request for an earlier-delivered JTG. For example, JTG S may be delivered in the first delivery request, but one or more of these additional delivery requests (JTG S+n) may incorporate commit request for JTG S. For example, the first storage node may append a table, database or other flag to any of the additional delivery requests indicating that an earlier JTG should now be committed. In this way, the first storage node may reduce the overall network traffic and storage node interactions necessary to provide a commit request to the storage nodes.

At some point, the delivery of one or more of the additional delivery requests is acknowledged by one or more peer storage nodes at 725. This delivery acknowledgement may take the form of a simple "ACK" of the original delivery or may incorporate data pertaining to the delivery request. Alternatively, this delivery request acknowledgement may take the form of a table including updated data regarding the delivery request and any other outstanding requests. Upon receipt of the delivery acknowledgement, the first storage node updates its peer storage queues to indicate that the particular node (or nodes) has acknowledged delivery of one or more of the additional delivery requests.

If the delivery request is not acknowledged by each storage node at 725, no further action regarding the specific JTG is taken and the first storage node continues to await a response. This is shown, for example, in FIG. 4 in which a single node has yet to acknowledge the delivery request. As discussed above, subsequent JTGs up to a JTG Max may continue to be issued in the interim.

When the delivery request acknowledgement is received at 725, the first storage node updates peer tables to indicate, at least, that the delivery request has been acknowledged. Peer tables are tables showing the JTG status for any JTGs involving the storage node in the storage group. So, for example, the first storage node may maintain a listing of all JTGs in which it is involved and the current status of those other peers with respect to those JTGs. Alternatively, each node may maintain a listing of a unique number of the most recent JTG delivered to, acknowledged by, commit requested, and/or commit acknowledged by each or a subset of each peer storage node in a storage system. Communication between storage nodes, such as subsequent delivery requests or delivery acknowledgements, may share these tables in order to update their respective tables regarding the present status of various JTGs across many nodes.

Next, the delivery acknowledgement is tested to determine if it incorporates a commit acknowledgement at 735. As with the delivery requests, the delivery acknowledgement for any of the additional JTGs may incorporate a commit acknowledgement for one of the earlier JTGs. So, for example, the first delivery request made at 710 by the first storage node may be delivered and acknowledgement may be received at any point. Any subsequent delivery request may incorporate a commit request for that first JTG. A delivery acknowledgement (which may be in response to the subsequent delivery request or another, later delivery request) may incorporate a commit acknowledgement for that first JTG. As discussed above, the delivery acknowledgement may incorporate an entire table regarding the status of one or more JTGs. If other messages, such as commit acknowledgements for one or more earlier JTGs are incorporated into the delivery request acknowledgment received at 725, the peer tables are updated to reflect those changes at 740.

A further determination is made at 745 whether the commit included in one of the delivery acknowledgments is the "last" commit acknowledgement for a given JTG. This means that commit acknowledgements have been received for all peers involved in a given JTG except for this last storage node. If the peer is the last peer to provide a commit acknowledgement, the peer tables are updated at 750 to include the commit acknowledgement and to reflect that the JTG has now been made active. The data operations making up the JTG are then made active in the DHT at 760.

Other storage nodes, for example storage nodes not involved in the newly-active JTG, may be made aware of the newly-committed JTG through the exchange of these updated peer tables in subsequent transaction. The table may also include a logical timestamp associated with the JTG that notes the data objects that have been made active at a logical time shown by the logical timestamp. The logical timestamp may be, for example, a monotonic clock associated with the issuance of each JTG by a particular storage node in order to uniquely identify each JTG. The process ends at 795.

Figure 8:
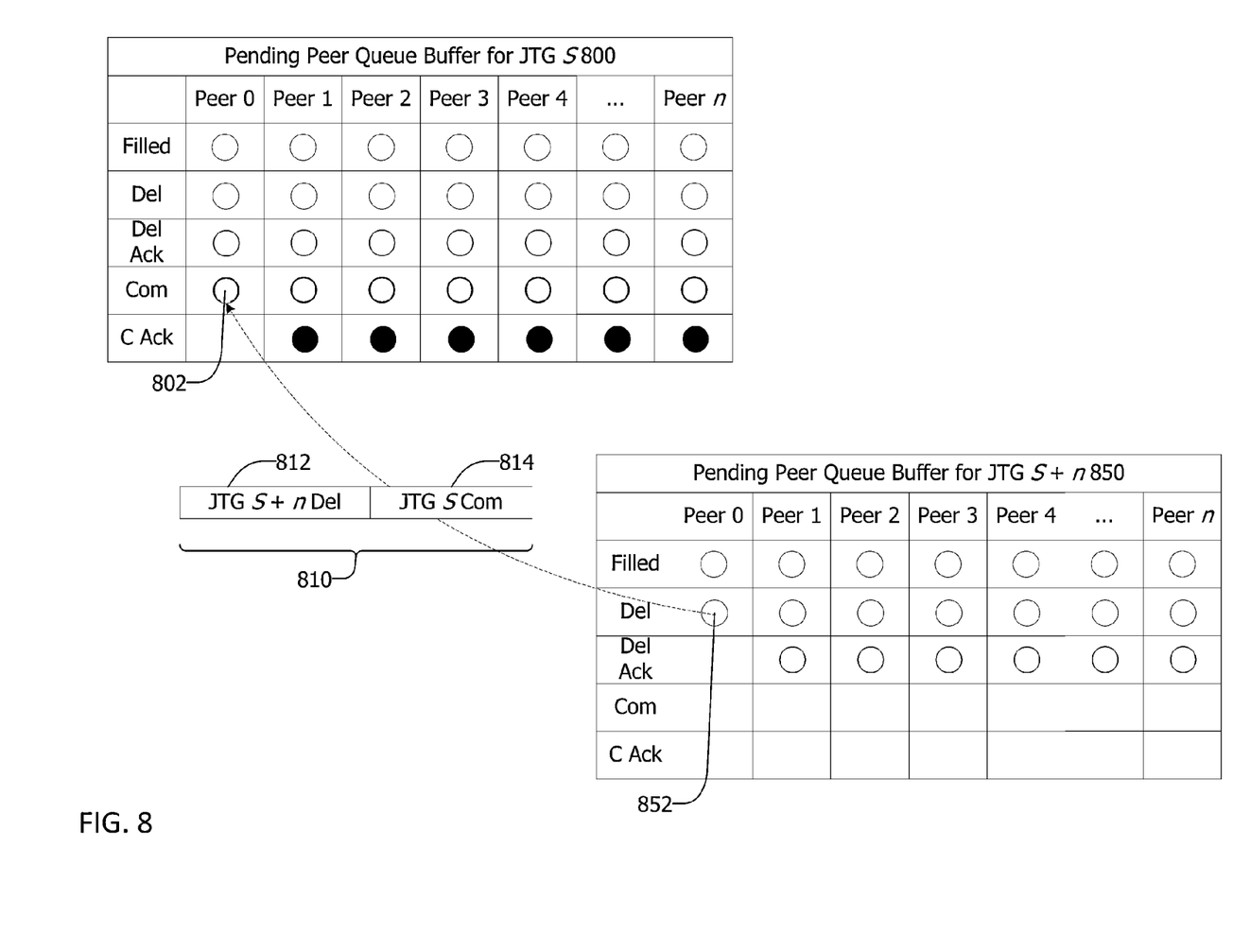
FIG. 8 is two pending peer queue buffers for JTGs S and S+n after a delivery request from JTG S+n.

FIG. 8 is two pending peer queue buffers for JTGs S 800 and S+n 800 after a delivery request from JTG S+n. In particular, the delivery request 852 in JTG S+n is called out because it has incorporated a commit request for an earlier JTG S 800. An abstraction of the data structure is shown in the delivery request 810 which includes both a delivery request 812 for JTG S+n along with a commit request 814 for JTG S. This data structure is described above with reference to FIG. 7, elements 720 and 725. In fact, delivery request 810 may incorporate a great deal more data pertaining to a number of JTGs, but it at least is capable of including a delivery request for one JTG in conjunction with a commit request for an earlier JTG.

Figure 9:
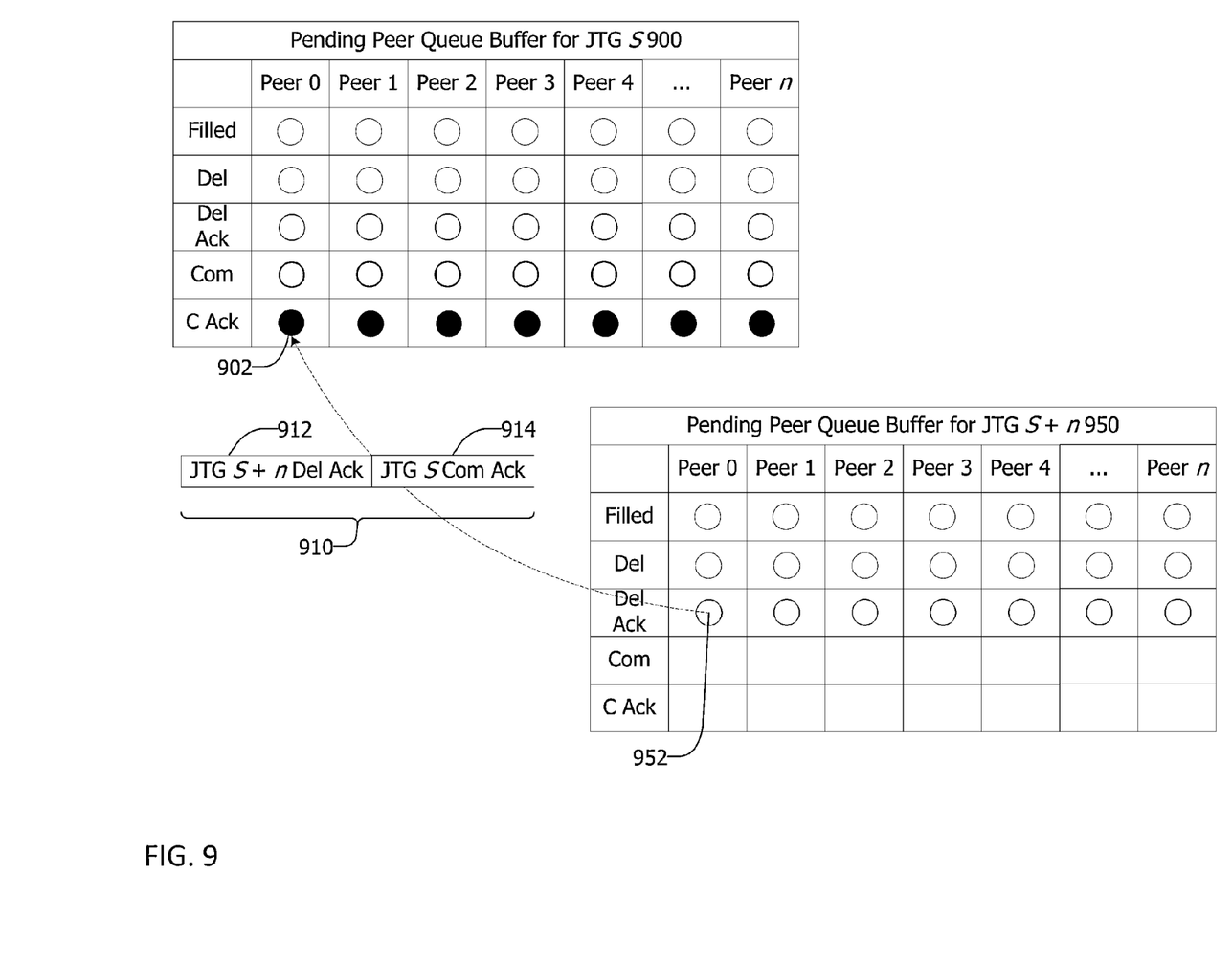
FIG. 9 is two pending peer queue buffers for JTGs S and S+n after a delivery acknowledgement from JTG S+n.

FIG. 9 is two pending peer queue buffers for JTGs S and S+n after a delivery acknowledgement from JTG S+n. Here, the delivery acknowledgement 952 from JTG S+n 950 incorporates a commit acknowledgement 902 for JTG S 900. An abstraction of the data structure is shown in the delivery acknowledgment 910 which incorporates a delivery acknowledgement 912 for JTG S+N along with a commit acknowledgement 914 for JTG S. As with the delivery request 810 above, the delivery acknowledgement may incorporate additional data, include a table of a status associated with a plurality of other JTGs, but at least incorporates both a delivery acknowledgement 912 and a commit acknowledgement.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A data storage method comprising:
 a first storage node issuing a first delivery request to a first set of other storage nodes in a storage system, the first storage node and the first set of other storage nodes making up a storage group, the first delivery request including a first at least one data operation for each of the first set of other storage nodes;

the first storage node issuing at least one other delivery request while the first delivery request remains outstanding, the at least one other delivery request including a second at least one data operation for each of a plurality of other storage nodes involved in the at least one other delivery request and a first commit request for each of the first set of other storage nodes;

the first storage node receiving a delivery acknowledgement regarding one of the at least one other delivery request, the delivery acknowledgement including a commit indicator regarding the first delivery request from a final one of the first set of other storage nodes; and the first storage node causing the first at least one data operation to be made active within the storage system in response to receipt of the commit indicator.

2. The method of claim 1 wherein the commit indicator is a commit acknowledgement affirmatively acknowledging that the one of the first set of other storage nodes has made the first at least one data operation active.

3. The method of claim 1 wherein the commit indicator is a monotonic timestamp associated with the commit request indicating that the commit request has been completed by the one of the first set of other storage nodes.

4. The method of claim 1 further comprising receiving commit indicators from each of the first set of other storage nodes before receiving the commit indicator from the final one of the first set of other storage nodes.

5. The method of claim 1 wherein the commit indicator for the first at least one data operation must be received before any commit indicator for the second at least one data operation is made active within the storage system.

6. The method of claim 1 wherein the commit indicator is maintained as a part of a table of activated storage operations within the storage group and wherein the final one of the first set of other storage nodes shares the table with the first storage node as a part of the delivery acknowledgement.

7. The method of claim 6 wherein the first storage node makes the at least one data operation active within the storage group after receipt of the table.

8. A distributed data storage system comprising:

a plurality of storage nodes, each storage node having at least one central processing unit, memory, non-volatile storage, network connectivity and input and output systems, each storage node including a plurality of hard disk drives (HDDs) and/or solid state drives (SSDs) coupled thereto, the distributed data storage system including a first storage node configured to perform actions comprising:

the first storage node issuing a first delivery request to a first set of other storage nodes in the distributed data storage system, the first storage node and the first set of other storage nodes making up a storage group, the first delivery request including a first at least one data operation for each of the first set of other storage nodes;

the first storage node issuing at least one other delivery request while the first delivery request remains outstanding, the at least one other delivery request including a second at least one data operation for each of a plurality of other storage nodes involved in the at least one other delivery request and a first commit request for each of the first set of other storage nodes;

the first storage node receiving a delivery acknowledgement regarding one of the at least one other delivery request, the delivery acknowledgement including a commit indicator regarding the first delivery request from a final one of the first set of other storage nodes;

the first storage node causing the first at least one data operation to be made active within the distributed data storage system in response to receipt of the commit indicator.

9. The distributed data storage system of claim 8 wherein the commit indicator is a commit acknowledgement affirmatively acknowledging that the one of the first set of storage nodes has made the first at least one data operation active.

10. The distributed data storage system of claim 8 wherein the commit indicator is a monotonic timestamp associated with the commit request indicating that the commit request has been completed by the one of the first set of other storage nodes.

11. The distributed data storage system of claim 8 wherein the first storage node is further configured to receive commit indicators from each of the first set of other storage nodes before receiving the commit indicator from the final one of the first set of other storage nodes.

12. The distributed data storage system of claim 8 wherein the commit indicator for the first at least one data operation must be received before any commit indicator for the second at least one data operation may be made active within the distributed data storage system.

13. The distributed data storage system of claim 8 wherein the commit indicator is maintained as a part of a table of activated storage operations within the storage group and wherein the final one of the first plurality of other storage nodes shares the table with the first storage node as a part of the delivery acknowledgement.

14. The method of claim 13 wherein the first storage node makes the at least one data operation active within the storage group after receipt of the table.

* * * * *